(12) United States Patent
Sprague et al.

(10) Patent No.: US 11,769,132 B1
(45) Date of Patent: Sep. 26, 2023

(54) P2P PAYMENTS VIA INTEGRATED 3RD PARTY APIS

(71) Applicant: Wells Fargo Bank, N.A., San Francisco, CA (US)

(72) Inventors: Philip Sprague, Matthews, NC (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 944 days.

(21) Appl. No.: 16/419,823

(22) Filed: May 22, 2019

(51) Int. Cl.
- *G06Q 20/22* (2012.01)
- *G06Q 20/10* (2012.01)
- *G06Q 20/08* (2012.01)

(52) U.S. Cl.
CPC ......... *G06Q 20/223* (2013.01); *G06Q 20/0855* (2013.01); *G06Q 20/10* (2013.01)

(58) Field of Classification Search
CPC .... G06Q 20/223; G06Q 20/0855; G06Q 20/10
See application file for complete search history.

(56) References Cited

U.S. PATENT DOCUMENTS

| | | | |
|---|---|---|---|
| 6,014,645 A | 1/2000 | Cunningham | |
| 6,324,524 B1 | 11/2001 | Lent et al. | |
| 6,795,812 B1 | 9/2004 | Lent et al. | |
| 6,980,969 B1 | 12/2005 | Tuchler et al. | |
| 7,155,411 B1 | 12/2006 | Blinn et al. | |
| 7,200,577 B2 | 4/2007 | Zissimopoulos et al. | |
| 7,233,926 B2 | 6/2007 | Durand et al. | |
| 7,366,694 B2 | 4/2008 | Lazerson | |
| 7,469,151 B2 | 12/2008 | Khan et al. | |
| 7,472,088 B2 | 12/2008 | Taylor et al. | |
| 7,512,565 B2 | 3/2009 | Li | |
| 7,698,712 B2 | 4/2010 | Schreter | |
| 7,784,684 B2 | 8/2010 | Labrou et al. | |
| 7,802,719 B2 | 9/2010 | Johnson et al. | |

(Continued)

FOREIGN PATENT DOCUMENTS

| | | | | |
|---|---|---|---|---|
| KR | 20130093233 A | 8/2013 | | |
| WO | 2017083565 A1* | 5/2017 | ............. | G06F 16/2255 |

OTHER PUBLICATIONS

Alhothaily, A., Alrawais, A., Song, T., Lin, B., & Cheng, X. (2017). QuickCash: Secure Transfer Payment Systems. Sensors (Basel, Switzerland), 17(6), 1376. https://doi.org/10.3390/s17061376 (Year: 2017).*

(Continued)

*Primary Examiner* — Scott C Anderson
*Assistant Examiner* — James H Miller
(74) *Attorney, Agent, or Firm* — Foley & Lardner LLP

(57) ABSTRACT

The current disclosure relates to systems, apparatuses, and methods of for performing an electronic transfer, including determining recipient information for the electronic transfer using a first user interface of the electronic banking platform, in response to determining the recipient information, two or more user interactive elements are displayed in a second user interface of the electronic banking platform, each of the two or more user interactive elements corresponds to a different one of a plurality of electronic P2P transfer platforms, receiving user input corresponding to a selected user interactive element of the two or more user interactive elements, the selected user interactive element corresponds to a selected electronic P2P transfer platform of the plurality of electronic P2P transfer platforms, and processing the electronic transfer using the electronic banking platform and the selected P2P transfer platform.

15 Claims, 8 Drawing Sheets

(56) References Cited

U.S. PATENT DOCUMENTS

| | | | |
|---|---|---|---|
| 7,822,688 B2 | 10/2010 | Labrou et al. |
| 7,849,003 B2 | 12/2010 | Egnatios et al. |
| 7,899,438 B2 | 3/2011 | Baker et al. |
| 7,926,711 B2 | 4/2011 | Taylor et al. |
| 7,930,244 B2 | 4/2011 | Zarin et al. |
| 8,016,192 B2 | 9/2011 | Messerges et al. |
| 8,027,914 B2 | 9/2011 | White et al. |
| 8,060,413 B2 | 11/2011 | Castell et al. |
| 8,078,140 B2 | 12/2011 | Baker et al. |
| 8,170,952 B2 | 5/2012 | White et al. |
| 8,175,923 B2 | 5/2012 | Gerken, III et al. |
| 8,175,967 B2 | 5/2012 | O'Leary et al. |
| 8,239,304 B1 | 8/2012 | Ahmad |
| 8,285,329 B1 | 10/2012 | Zhu |
| 8,429,047 B2 | 4/2013 | Hurst |
| 8,442,914 B2 | 5/2013 | Killian et al. |
| 8,467,766 B2 | 6/2013 | Rackley, III et al. |
| 8,468,576 B2 | 6/2013 | Doman et al. |
| 8,473,355 B2 | 6/2013 | Quigley et al. |
| 8,510,220 B2 | 8/2013 | Rackley, III et al. |
| 8,523,054 B2 | 9/2013 | Yankovich et al. |
| 8,533,031 B2 | 9/2013 | Lefebvre et al. |
| 8,561,172 B2 | 10/2013 | Buss et al. |
| 8,566,239 B2 | 10/2013 | Arthur et al. |
| 8,571,983 B1 | 10/2013 | Blackhurst et al. |
| 8,577,803 B2 | 11/2013 | Chatterjee et al. |
| 8,645,971 B2 | 2/2014 | Carlson et al. |
| 8,671,055 B2 | 3/2014 | Spodak et al. |
| 8,693,993 B2 | 4/2014 | Stifelman |
| 8,781,923 B2 | 7/2014 | Pitroda et al. |
| 8,788,333 B2 | 7/2014 | Alba et al. |
| 8,799,148 B2 | 8/2014 | Chandran |
| 8,825,872 B2 | 9/2014 | Reisman |
| 8,839,142 B2 | 9/2014 | Chaudhri et al. |
| 8,893,250 B2 | 11/2014 | Mattsson et al. |
| 8,903,737 B2 | 12/2014 | Cameron et al. |
| 8,918,338 B1 | 12/2014 | Bornhofen et al. |
| 8,919,658 B2 | 12/2014 | Diamond |
| 8,923,827 B2 | 12/2014 | Wentker et al. |
| 8,954,871 B2 | 2/2015 | Louch et al. |
| 9,015,066 B2 | 4/2015 | Scipioni et al. |
| 9,053,474 B2 | 6/2015 | White |
| 9,064,247 B2 | 6/2015 | Baer et al. |
| 9,064,281 B2 | 6/2015 | Ballard et al. |
| 9,087,428 B1 | 7/2015 | Velline et al. |
| 9,088,423 B2 | 7/2015 | Allen et al. |
| 9,092,776 B2 | 7/2015 | Dessert |
| 9,117,242 B1 | 8/2015 | Ellis et al. |
| 9,152,739 B2 | 10/2015 | Aasen et al. |
| 9,189,787 B1 | 11/2015 | Koh et al. |
| 9,208,488 B2 | 12/2015 | Liberty |
| 9,235,831 B2 | 1/2016 | Rolf |
| 9,235,839 B2 | 1/2016 | Dua |
| 9,256,871 B2 | 2/2016 | Anderson et al. |
| 9,280,765 B2 | 3/2016 | Hammad |
| 9,285,954 B2 | 3/2016 | Yang et al. |
| 9,317,849 B2 | 4/2016 | Pitroda et al. |
| 9,330,388 B2 | 5/2016 | Pitroda et al. |
| 9,355,393 B2 | 5/2016 | Purves et al. |
| 9,356,894 B2 | 5/2016 | Appelman et al. |
| 9,361,606 B2 | 6/2016 | Hertel et al. |
| 9,380,403 B2 | 6/2016 | Khan |
| 9,406,065 B2 | 8/2016 | Bondesen et al. |
| 9,430,768 B2 | 8/2016 | Graylin et al. |
| 9,516,487 B2 | 12/2016 | Powell et al. |
| 9,524,500 B2 | 12/2016 | Dave et al. |
| 9,524,501 B2 | 12/2016 | Weber |
| 9,542,172 B2 | 1/2017 | Alsina et al. |
| 9,886,691 B2 | 2/2018 | Desai et al. |
| 10,114,534 B2 | 10/2018 | Kasterstein et al. |
| 10,262,320 B2 | 4/2019 | Moghadam |
| 10,482,449 B1* | 11/2019 | Gantert ............ G06Q 20/3274 |
| 11,062,291 B1* | 7/2021 | Brady et al. ......... G06Q 20/223 |
| 2002/0016769 A1 | 2/2002 | Barbara et al. |
| 2002/0122076 A1 | 9/2002 | Nakaki |
| 2003/0179237 A1 | 9/2003 | Nelson et al. |
| 2004/0111367 A1 | 6/2004 | Gallagher et al. |
| 2004/0148252 A1* | 7/2004 | Fleishman ........... G06Q 20/223 |
| | | 705/39 |
| 2007/0255662 A1* | 11/2007 | Tumminaro ........... G06Q 20/10 |
| | | 705/79 |
| 2007/0300185 A1 | 12/2007 | Macbeth et al. |
| 2008/0006685 A1 | 1/2008 | Rackley III et al. |
| 2009/0081989 A1* | 3/2009 | Wuhrer ................ H04M 15/55 |
| | | 455/406 |
| 2010/0030651 A1 | 2/2010 | Matotek et al. |
| 2010/0076833 A1 | 3/2010 | Nelsen |
| 2010/0088188 A1 | 4/2010 | Kumar et al. |
| 2010/0114731 A1 | 5/2010 | Kingston et al. |
| 2010/0125495 A1 | 5/2010 | Smith et al. |
| 2011/0125644 A1* | 5/2011 | Fleishman et al. .... G06Q 20/02 |
| | | 705/44 |
| 2012/0022944 A1 | 1/2012 | Volpi |
| 2012/0036042 A1 | 2/2012 | Graylin et al. |
| 2012/0116967 A1 | 5/2012 | Klein et al. |
| 2012/0158584 A1 | 6/2012 | Behren et al. |
| 2012/0290449 A1 | 11/2012 | Mullen et al. |
| 2013/0024371 A1 | 1/2013 | Hariramani et al. |
| 2013/0054336 A1 | 2/2013 | Graylin |
| 2013/0054454 A1 | 2/2013 | Purves et al. |
| 2013/0054470 A1 | 2/2013 | Campos et al. |
| 2013/0103685 A1 | 4/2013 | Preneel et al. |
| 2013/0124349 A1 | 5/2013 | Khan et al. |
| 2013/0159080 A1 | 6/2013 | Wu et al. |
| 2013/0159178 A1 | 6/2013 | Colon et al. |
| 2013/0173456 A1 | 7/2013 | Grigg et al. |
| 2013/0191397 A1 | 7/2013 | Avadhanam et al. |
| 2013/0246260 A1 | 9/2013 | Barten et al. |
| 2013/0254028 A1 | 9/2013 | Salci |
| 2013/0254102 A1 | 9/2013 | Royyuru |
| 2013/0268885 A1 | 10/2013 | Lim et al. |
| 2013/0332343 A1 | 12/2013 | Desai et al. |
| 2013/0339234 A1 | 12/2013 | Prakash et al. |
| 2014/0012751 A1 | 1/2014 | Kuhn et al. |
| 2014/0032394 A1 | 1/2014 | Liberty et al. |
| 2014/0040052 A1 | 2/2014 | Arthur et al. |
| 2014/0040127 A1 | 2/2014 | Chatterjee et al. |
| 2014/0040802 A1 | 2/2014 | Abanami et al. |
| 2014/0046784 A1 | 2/2014 | Prakash et al. |
| 2014/0052634 A1 | 2/2014 | Baron et al. |
| 2014/0074569 A1 | 3/2014 | Francis et al. |
| 2014/0074637 A1 | 3/2014 | Hammad |
| 2014/0089119 A1 | 3/2014 | Fahn et al. |
| 2014/0089185 A1 | 3/2014 | Desai et al. |
| 2014/0114706 A1 | 4/2014 | Blakely |
| 2014/0122097 A1 | 5/2014 | Taylor et al. |
| 2014/0122331 A1 | 5/2014 | Vaish et al. |
| 2014/0122563 A1 | 5/2014 | Singh et al. |
| 2014/0129435 A1 | 5/2014 | Pardo et al. |
| 2014/0143089 A1 | 5/2014 | Campos et al. |
| 2014/0200983 A1 | 7/2014 | Bacastow et al. |
| 2014/0207680 A1 | 7/2014 | Rephlo |
| 2014/0222597 A1 | 8/2014 | Nadella et al. |
| 2014/0222670 A1 | 8/2014 | Concannon |
| 2014/0244462 A1 | 8/2014 | Maenpaa et al. |
| 2014/0244480 A1 | 8/2014 | Kanjlia et al. |
| 2014/0244495 A1 | 8/2014 | Davis et al. |
| 2014/0279566 A1 | 9/2014 | Verma et al. |
| 2014/0282971 A1 | 9/2014 | Gustavson et al. |
| 2014/0310151 A1 | 10/2014 | Shishkov et al. |
| 2014/0324690 A1 | 10/2014 | Allen et al. |
| 2014/0337222 A1 | 11/2014 | Damola et al. |
| 2014/0344153 A1 | 11/2014 | Raj et al. |
| 2014/0351147 A1 | 11/2014 | Castrechini et al. |
| 2014/0372299 A1 | 12/2014 | Singh et al. |
| 2015/0006271 A1 | 1/2015 | Oppenheim et al. |
| 2015/0012425 A1 | 1/2015 | Mathew |
| 2015/0019313 A1 | 1/2015 | Alba et al. |
| 2015/0019421 A1 | 1/2015 | Low et al. |
| 2015/0026024 A1 | 1/2015 | Calman et al. |
| 2015/0026049 A1 | 1/2015 | Theurer et al. |
| 2015/0058213 A1 | 2/2015 | Lee Kim-Koon et al. |
| 2015/0066688 A1 | 3/2015 | Blackhurst et al. |
| 2015/0066691 A1 | 3/2015 | Ready et al. |
| 2015/0081540 A1 | 3/2015 | Grigg et al. |
| 2015/0088631 A1 | 3/2015 | Mitchell |
| 2015/0088753 A1 | 3/2015 | Van Der Schueren |
| 2015/0121308 A1 | 4/2015 | Zhong et al. |

(56) References Cited

U.S. PATENT DOCUMENTS

| | | |
|---|---|---|
| 2015/0134508 A1* | 5/2015 | Lucas et al. ......... G06Q 20/384 705/39 |
| 2015/0149308 A1 | 5/2015 | Lin |
| 2015/0170141 A1 | 6/2015 | Klingen |
| 2015/0186872 A1 | 7/2015 | Sobol et al. |
| 2015/0193093 A1 | 7/2015 | Grover et al. |
| 2015/0206136 A1 | 7/2015 | Maddocks et al. |
| 2015/0213545 A1 | 7/2015 | Gomez-Rosado et al. |
| 2015/0220247 A1 | 8/2015 | Bari et al. |
| 2015/0220914 A1 | 8/2015 | Purves et al. |
| 2015/0248664 A1 | 9/2015 | Makhdumi et al. |
| 2015/0254636 A1 | 9/2015 | Yoon et al. |
| 2015/0254638 A1 | 9/2015 | Bondesen et al. |
| 2015/0254639 A1 | 9/2015 | Radu |
| 2015/0254644 A1 | 9/2015 | Bondesen et al. |
| 2015/0254645 A1 | 9/2015 | Bondesen et al. |
| 2015/0254647 A1 | 9/2015 | Bondesen et al. |
| 2015/0302396 A1 | 10/2015 | Jeon |
| 2015/0332252 A1 | 11/2015 | Shahrokhi et al. |
| 2015/0348002 A1 | 12/2015 | Van Os et al. |
| 2015/0348018 A1 | 12/2015 | Campos et al. |
| 2015/0371326 A1 | 12/2015 | Montesano et al. |
| 2016/0019525 A1 | 1/2016 | Lin |
| 2016/0019530 A1 | 1/2016 | Wang et al. |
| 2016/0041718 A1 | 2/2016 | Wood et al. |
| 2016/0048822 A1 | 2/2016 | Forrest |
| 2016/0048864 A1 | 2/2016 | Beer et al. |
| 2016/0055513 A1 | 2/2016 | Kuhn et al. |
| 2016/0071074 A1 | 3/2016 | Baird |
| 2016/0078428 A1 | 3/2016 | Moser et al. |
| 2016/0086153 A1 | 3/2016 | Rolf |
| 2016/0092866 A1 | 3/2016 | Liberty et al. |
| 2016/0092870 A1 | 3/2016 | Salama et al. |
| 2016/0119296 A1 | 4/2016 | Laxminarayanan et al. |
| 2016/0125394 A1 | 5/2016 | Desai et al. |
| 2016/0140460 A1 | 5/2016 | Boyd, Jr. |
| 2016/0180304 A1* | 6/2016 | Carriles et al. ...... G06Q 20/401 705/44 |
| 2016/0180328 A1 | 6/2016 | Loomis |
| 2016/0180332 A1 | 6/2016 | Wilczynski |
| 2016/0192108 A1 | 6/2016 | Chaudhary et al. |
| 2016/0203467 A1 | 7/2016 | Khan et al. |
| 2016/0210626 A1 | 7/2016 | Ortiz et al. |
| 2016/0232513 A1 | 8/2016 | Purves et al. |
| 2016/0232518 A1 | 8/2016 | Butler, IV |
| 2016/0232546 A1 | 8/2016 | Ranft et al. |
| 2016/0247138 A1 | 8/2016 | Wallner |
| 2016/0253651 A1 | 9/2016 | Park et al. |
| 2016/0253652 A1 | 9/2016 | Je et al. |
| 2016/0253669 A1 | 9/2016 | Yoon et al. |
| 2016/0260086 A1 | 9/2016 | Cho et al. |
| 2016/0260090 A1 | 9/2016 | Healy et al. |
| 2016/0267513 A1 | 9/2016 | Walz et al. |
| 2016/0275482 A1 | 9/2016 | Zhou |
| 2016/0283923 A1 | 9/2016 | Hertel et al. |
| 2016/0283925 A1 | 9/2016 | Lavu et al. |
| 2016/0283929 A1 | 9/2016 | Matotek et al. |
| 2016/0292673 A1 | 10/2016 | Chandrasekaran |
| 2016/0358167 A1 | 12/2016 | Van Os et al. |
| 2016/0364744 A1 | 12/2016 | Stone et al. |
| 2017/0024720 A1 | 1/2017 | Shah |
| 2017/0039599 A1 | 2/2017 | Tunnell et al. |
| 2017/0132615 A1* | 5/2017 | Castinado et al. ... H04L 9/3236 |
| 2018/0211249 A1 | 7/2018 | Sims et al. |
| 2018/0336542 A1* | 11/2018 | Wilson et al. ......... G06Q 20/10 |
| 2019/0057443 A1* | 2/2019 | Kanjlia et al. ..... G06Q 20/3223 |
| 2020/0265392 A1* | 8/2020 | Garrett ............. G06Q 20/3278 |
| 2020/0265457 A1* | 8/2020 | Miller et al. ......... G06Q 20/382 |

OTHER PUBLICATIONS

U.S Appl. No. 61/808,092 filed Feb. 20, 2019 (Year: 2019).*

* cited by examiner

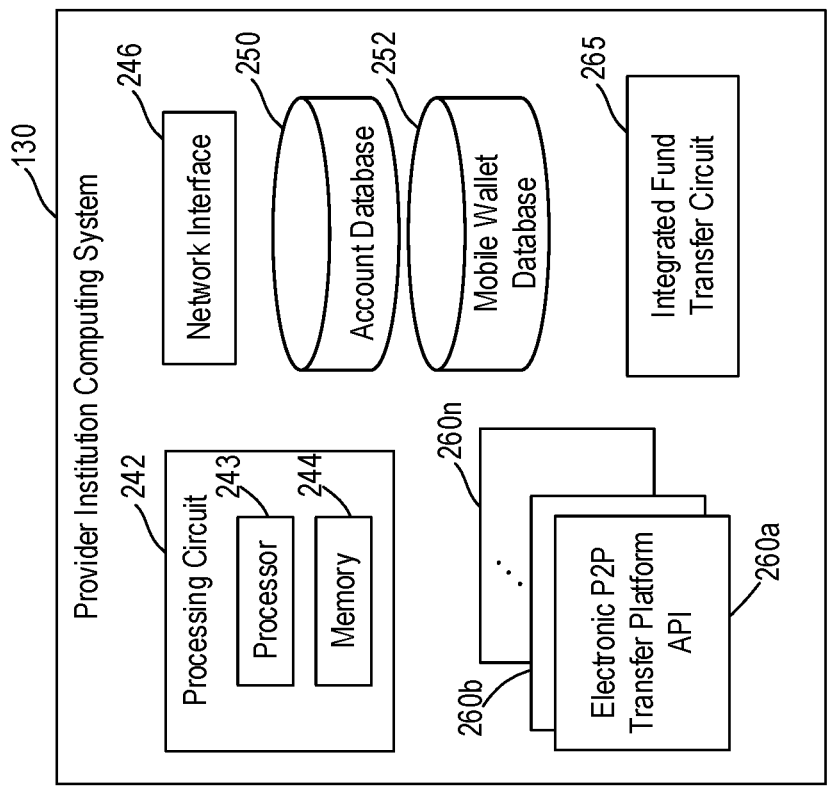
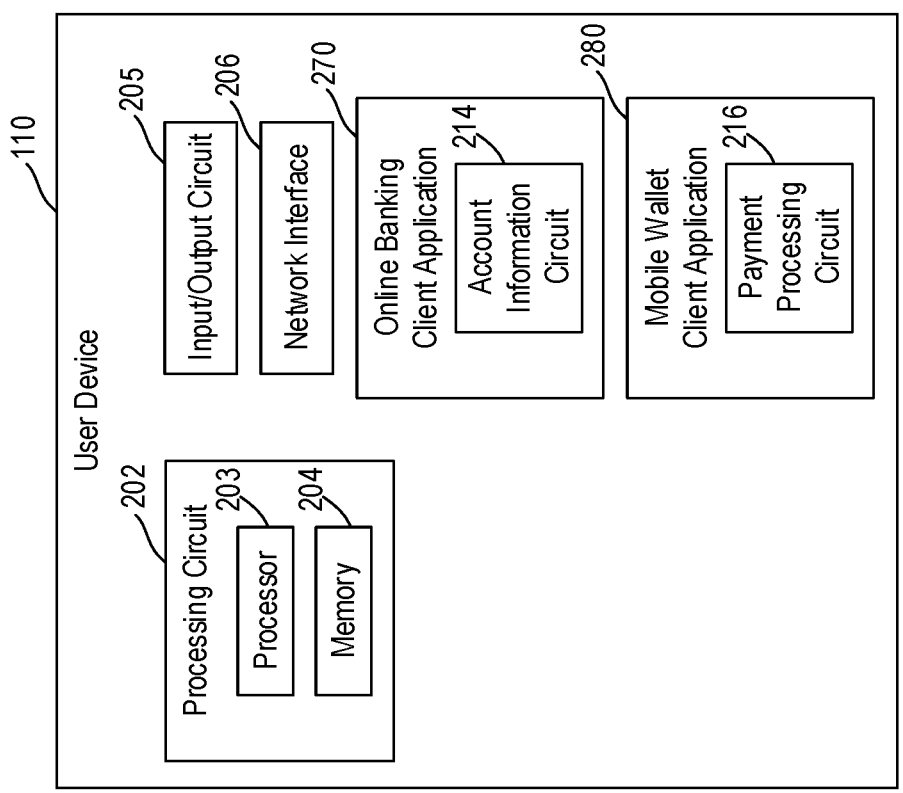

P2P PAYMENTS VIA INTEGRATED 3RD PARTY APIS

BACKGROUND

An electronic person-to-person (P2P) transfer platform enables quick and user-friendly transfer of funds between a sender and a recipient. Electronic P2P transfer platforms can be mobile applications or web-based interfaces. There are numerous electronic P2P transfer platforms, examples of which include Venmo®, Apple Pay®, Google Pay®, Samsung Pay®, Cash App®, Zelle®, PayPal®, Circle Pay®, Popmoney®, Messenger®, and so on. A user typically uses multiple different electronic P2P transfer platforms, for example, by installing different mobile applications on a mobile device, by having accounts with different electronic P2P transfer platforms, and so on. Due to the numerosity of the electronic P2P transfer platforms available for use, both parties to a fund transfer have to agree on a particular electronic P2P transfer platform to use for the fund transfer. Most electronic P2P transfer preferences (i.e., which electronic P2P transfer platform to use) are driven by the recipients and not the senders.

SUMMARY

In some arrangements, a method for performing an electronic transfer from a sender to a recipient using an electronic banking platform provided by a provider institution of the sender includes determining recipient information for the electronic transfer using a first user interface of the electronic banking platform. The recipient information comprises a recipient identifier that identifies the recipient. In response to determining the recipient information, two or more user interactive elements are displayed in a second user interface of the electronic banking platform. Each of the two or more user interactive elements corresponds to a different one of a plurality of electronic P2P transfer platforms. The method further includes receiving user input corresponding to a selected user interactive element of the two or more user interactive elements. The selected user interactive element corresponds to a selected electronic P2P transfer platform of the plurality of electronic P2P transfer platforms. The method further includes processing the electronic transfer using the electronic banking platform and the selected P2P transfer platform.

In some arrangements, a non-transitory computer-readable medium having computer-readable instructions such that, when executed, causes a processor of a provider institution computing system to perform an electronic transfer from a sender to a recipient using an electronic banking platform provided by the provider institution computing, the processor is configured to determine recipient information for the electronic transfer using a first user interface of the electronic banking platform. The recipient information comprises a recipient identifier that identifies the recipient. In response to determining the recipient information, the processor is further configured to display two or more user interactive elements in a second user interface of the electronic banking platform. Each of the two or more user interactive elements corresponds to a different one of a plurality of electronic P2P transfer platforms. The processor is further configured to receive user input corresponding to a selected user interactive element of the two or more user interactive elements. The selected user interactive element corresponds to a selected electronic P2P transfer platform of the plurality of electronic P2P transfer platforms. The processor is further configured to process the electronic transfer using the electronic banking platform and the selected P2P transfer platform.

In some arrangements, a provider institution computing system configured to perform an electronic transfer from a sender to a recipient using an electronic banking platform provided by the provider institution computing, the provider institution computing system includes a network device and a processing circuit having a processor and a memory. The processing circuit is configured to determine recipient information for the electronic transfer using a first user interface of the electronic banking platform. The recipient information comprises a recipient identifier that identifies the recipient. In response to determining the recipient information, the processing circuit is configured to display two or more user interactive elements in a second user interface of the electronic banking platform. Each of the two or more user interactive elements corresponds to a different one of a plurality of electronic P2P transfer platforms. The processing circuit is configured to receive user input corresponding to a selected user interactive element of the two or more user interactive elements. The selected user interactive element corresponds to a selected electronic P2P transfer platform of the plurality of electronic P2P transfer platforms. The processing circuit is further configured to process the electronic transfer using the electronic banking platform and the selected P2P transfer platform.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 2A is a block diagram illustrating an example of the user device of FIG. 1, according to some arrangements.

FIG. 2B is a block diagram illustrating an example of the provider institution computing system of FIG. 1, according to some arrangements.

DETAILED DESCRIPTION

Figure 1:
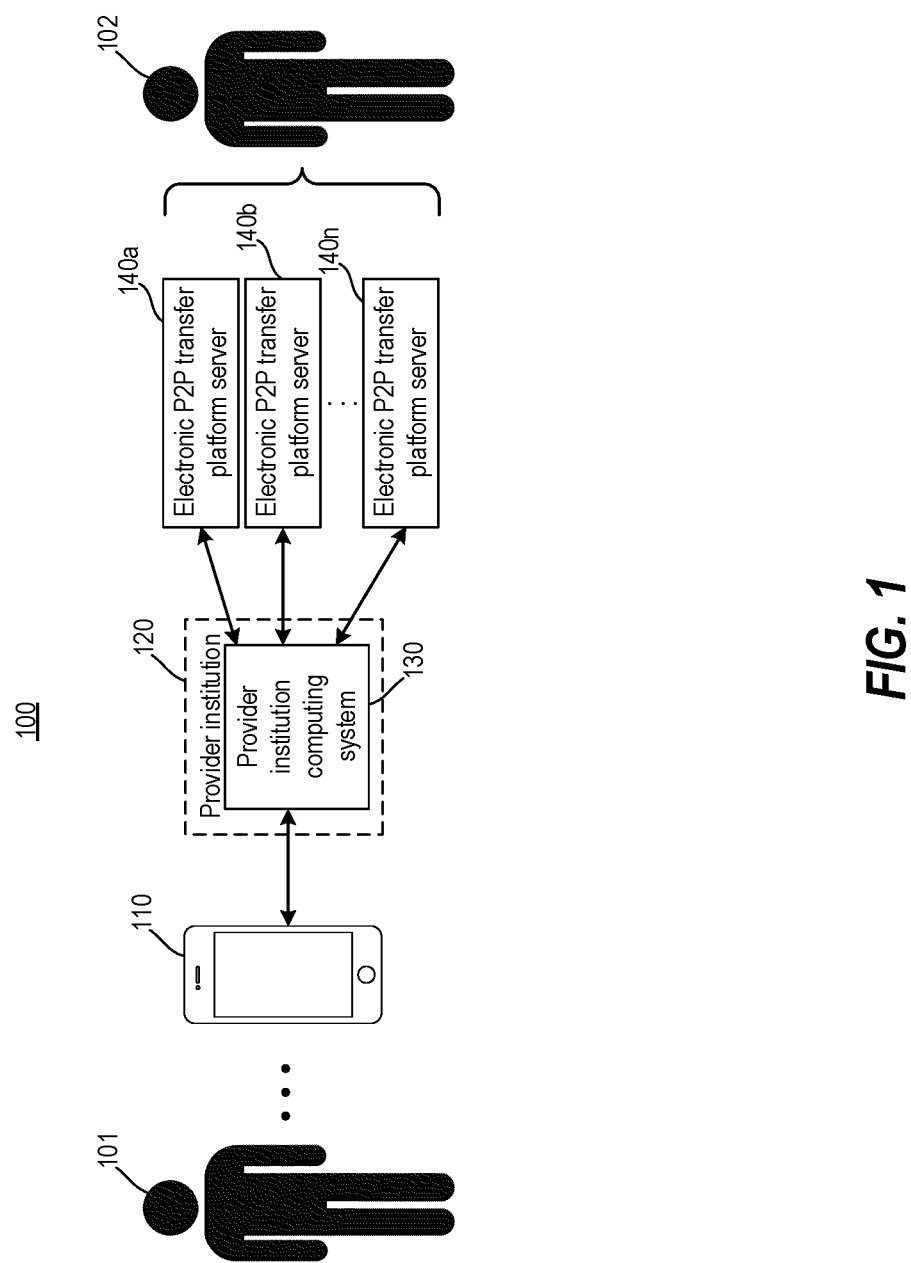
FIG. 1 is a diagram of an example system configured to transfer funds from a sender to a recipient, according to various arrangements.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Due to the numerosity of electronic P2P transfer platforms available for selection for a fund transfer and that electronic P2P transfer preferences are typically driven by recipients, the present disclosure relates to integrating an electronic banking platform (e.g., a mobile wallet application, an online banking application, or the like) of a sender with multiple electronic P2P transfer platforms via application program interfaces (APIs) for allowing the sender to use the electronic banking platform and a selected one of the multiple electronic P2P transfer platforms to transfer funds to a recipient.

FIG. 1 is a diagram of an example system 100 for transferring funds from a sender 101 to a recipient 102 according to various arrangements. Referring to FIG. 1, the sender 101 can be a customer of a financial institution 120. The sender 101 is an account holder of at least one financial account (e.g., a demand deposit account (DDA), credit account, and so on) at the financial institution 120. The financial institution 120 provides financial products and services (e.g., the at least one financial account) using a provider institution computing system 130. The sender 101 operates or is otherwise associated with a user device 110, for communication with the financial institution computing system 130. Examples of the user device 110 include but are not limited to, a mobile phone (e.g., an iPHONE®, an ANDROID® phone, a WINDOWS® phone, a SYMBIAN® phone or the likes), a tablet computer, a personal computer (e.g., a desktop or a laptop), a smart TV, a smart watch, a gaming system, an IP TV box, and so on.

The sender 101 can operate the user device 110 for accessing financial products and services provided by the financial institution 120. The provider institution computing system 130 is configured to provide financial products and services (e.g., DDAs, credit accounts, and so on) to the sender 101 using an electronic banking platform. Examples of the electronic banking platform include but are not limited to, a mobile wallet application, an online banking application, and so on. The user device 110 is configured to execute a client-side application of the electronic banking platform for accessing the financial products and services provided by the financial institution 120.

The provider institution computing system 130 is operatively coupled to each of multiple electronic P2P transfer platform servers 140a-140n via a respective one of electronic P2P transfer platform APIs. Each of the electronic P2P transfer platform servers 140a-140n provides an electronic P2P transfer platform, which facilitates transfer of funds between two users of the electronic P2P transfer platform. Each user of an electronic P2P transfer platform is identified by a unique account identifier (e.g., a phone number, an email, a username, and so on). That is, in some examples, both parties to a fund transfer facilitated by an electronic P2P transfer platform are enrolled in the electronic P2P transfer platform. In some examples, the sender 101 has accounts in one or more or all of the electronic P2P transfer platform servers 140a-140n, and the recipient 102 has accounts in one or more or all of the electronic P2P transfer platform servers 140a-140n.

Traditionally, each electronic P2P transfer platform can be accessed by a user using a mobile application or web-based interface (collectively referred to herein as a client-side electronic P2P transfer application) installed on a user device (e.g., the user device 110) of the user. The operations of the client-side electronic P2P transfer application on the user device correspond to a client-side experience for the electronic P2P transfer platform. For example, one or more financial accounts such as a DDA or a credit account (provided by a financial institution separate from any entity that provides the electronic P2P transfer platform) can be added to the electronic P2P transfer platform account of the user via the client-side electronic P2P transfer application. In other words, the financial accounts can be linked to the electronic P2P transfer platform such that the financial accounts can be the source or destination of a fund transfer. That is, the user can transfer funds from the financial accounts to another user via the electronic P2P transfer platform and receive funds transferred from another user to the financial accounts via the electronic P2P transfer platform. In some examples, each user of the electronic P2P transfer platform has a dedicated account in the electronic P2P transfer platform for storing funds. The dedicated account, which is provided by the electronic P2P transfer platform, can be used for a source or destination of a fund transfer. For example, the user can transfer funds from the dedicated account to another user via the electronic P2P transfer platform and receive funds transferred from another user to the dedicated account via the electronic P2P transfer platform. Funds can be transferred from the dedicated account to the financial accounts, or from the financial accounts to the dedicate account, according to user preference inputted via the electronic P2P transfer platform.

The arrangements described herein allow the sender 101 to interact with the client-side application of the electronic banking platform (and not any client-side electronic P2P transfer application) to transfer fund from a financial account of the sender 101 (accessible using the electronic banking platform) to an account of the sender 101 of a selected one of the electronic P2P transfer platforms 140a-140n, and then to transfer the fund from the account of the sender 101 to an account of the recipient 102 of the selected one of the electronic P2P transfer platforms 140a-140n. The sender 101 needs to interact with only the client-side application of the electronic banking platform to achieve the transfer, which is performed via the selected one of the electronic P2P transfer platforms 140a-140n.

As described in further details herein, by logging into the client-side application of the electronic banking platform, the sender 101 is automatically logged into those of the electronic P2P transfer platforms 140a-140n for which the sender 101 has accounts. Once logged in, the sender 101 can identify the recipient 102 using a user-interactive interface provided by the client-side application of the electronic banking platform. The user interactive interfaces provided by the client-side application of the electronic banking platform are displayed by the user device 110. After the recipient 102 is identified, the sender 101 can select one of the electronic P2P transfer platforms 140a-140n by selecting a corresponding user interactive element displayed in the user-interactive interface provided by the client-side application of the electronic banking platform. Then, the selected one of the electronic P2P transfer platforms 140a-140n verifies the recipient 102 automatically and performs the fund transfer automatically. As such, aside from the sender 101 logging into the client-side application of the electronic banking platform and input recipient information (e.g., identification of the recipient 102, transfer amount, and so on), the sender 101 does not need to take additional actions to complete the fund transfer. That is, the sender 101 does not need to log into the electronic P2P transfer platforms 140a-140n or identify the recipient 102 using any user interfaces provided by the selected one of the electronic P2P transfer platforms 140a-140n. Instead, all actions of the sender 101 is performed via the user interfaces provided by the client-side application of the electronic banking platform. Accordingly, the client-side application of the electronic banking platform provides seamless sender-side user experience for fund transfers using one of the electronic P2P transfer platforms 140a-140n.

The user device 110 is connected to the financial institution computing system 130 via a communication network. The financial institution computing system 130 is connected to the electronic P2P transfer platform servers 140a-140n via one or more communication networks. Each of the communication networks can be any suitable Local Area Network (LAN) or Wide Area Network (WAN). For example, the communication network can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The communication network is structured to permit the exchange of data, values, instructions, messages, and the like between the user device 110 and the financial institution computing system 130 and between the financial institution computing system 130 and the electronic P2P transfer platform servers 140a-140n.

FIG. 2A is a block diagram illustrating an example of the user device 110 of FIG. 1, according to some arrangements. FIG. 2B is a block diagram illustrating an example of the provider institution computing system 130 of FIG. 1, according to some arrangements. Referring to FIGS. 1-2B, the provider institution computing system 130 includes a processing circuit 242 having a processor 243 and a memory 244. The processor 243 can be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 244 (e.g., Random Access Memory (RAM), Read-Only Memory (ROM), Non-volatile RAM (NVRAM), Flash Memory, hard disk storage, etc.) is configured to store data and/or computer code for facilitating at least some of the various processes described herein. The memory 244 includes tangible, non-transient volatile memory, or non-volatile memory. The memory 244 may include a non-transitory processor readable medium storing programming logic that, when executed by the processor 243, controls the operations of the provider institution computing system 130. In some arrangements, the processor 243 and the memory 244 form various processing circuits (e.g., an integrated fund transfer circuit 265) described with respect to the provider institution computing system 130.

As shown, the provider institution computing system 130 includes a network interface 246. The network interface 246 is structured for sending and receiving data over a communication network (e.g., to and from the user device 110, to and from the electronic P2P transfer platform servers 140a-140n, etc.). Accordingly, the network interface 246 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The provider institution computing system 130 includes an account database 250 that stores customer information and account information relating to one or more accounts held by a customer (e.g., the sender 101) with the financial institution 120. The customer information includes one or more of customer identification information (e.g., a name, address, email, phone number, authentication information such as username, password, biometrics, and so on) used to identify and authenticate a customer. The account information for each account includes one or more of an account type, available fund, incurred credit, and transaction history of transactions made using the account. Examples of account types include but are not limited to, a DDA (e.g., a checking account, a debit card account, and so on), credit account (e.g., a credit card account), and so on.

The provider institution computing system 130 includes a mobile wallet account database 252 for storing mobile wallet accounts of customers, including the sender 101. The mobile wallet accounts permit payments via a mobile wallet client application 280 of the user device 110. The mobile wallet account database 252 stores transaction history of transactions made by the sender 101 using the mobile wallet client application 280.

The provider institution computing system 130 includes electronic P2P transfer platform APIs 260a-260n, each of which corresponds to a different one of the electronic P2P transfer platform servers 140a-140n. That is, each of the electronic P2P transfer platform APIs 260a-260n serve as an interface to a corresponding one of the electronic P2P transfer platform servers 140a-140n by allowing secure exchange of data between an integrated fund transfer circuit 265 of the provider institution computing system 130 and the corresponding one of the electronic P2P transfer platform servers 140a-140n. Each of the electronic P2P transfer platform APIs 260a-260n includes suitable programs, protocols, routines, and such that are configured to facilitate in authenticating the sender 101 with a corresponding one of the electronic P2P transfer platform servers 140a-140n, identifying the recipient 102 with the corresponding one of the electronic P2P transfer platform servers 140a-140n, and transferring funds from an account of the sender 101 (e.g., in the account database 250, in the mobile wallet account database 252, and so on) to an account of the recipient 102 managed by a corresponding one of the electronic P2P transfer platform servers 140a-140n in the manner described.

The integrated fund transfer circuit 265 is configured to facilitate transfer of funds from an account of the sender 101 (e.g., in the account database 250, in the mobile wallet account database 252, and so on) to an account of the recipient 102 managed by one of the electronic P2P transfer platform servers 140a-140n in the manner described. In other words, the integrated fund transfer circuit 265 and the electronic P2P transfer platform APIs 260a-260n operatively coupled thereto bridge the gap between the account of the sender 101 (e.g., in the account database 250, in the mobile wallet account database 252, and so on) and the account of the recipient 102 managed by one of the electronic P2P transfer platform servers 140a-140n. The integrated fund transfer circuit 265 is operatively coupled to one or more of the account database 250 or the mobile wallet database 252 to access information stored thereon with respect to the sender 101. In some examples, the integrated fund transfer circuit 265 is implemented with the processing circuit 242. For example, the integrated fund transfer circuit 265 can be implemented as a software application stored within the memory 244 and executed by the processor 243. Accordingly, such examples can be implemented with minimal or no additional hardware costs. However, other implementations may rely on dedicated hardware specifically configured for performing operations of the integrated fund transfer circuit 265.

The sender 101 operates or is associated with the user device 110. In some arrangements, the user device 110 includes a processing circuit 202 having a processor 203 and memory 204. The processor 203 can be implemented as a general-purpose processor, an ASIC, one or more FPGAs, a DSP, a group of processing components that are distributed over various geographic locations or housed in a single location or device, or other suitable electronic processing components. The memory 204 can include a non-transitory, processor readable medium (e.g., RAM, NVRAM, ROM, Flash Memory, hard disk storage, etc.) for storing data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The user device 110 includes an input/output circuit 205 configured to receive user input from and provide information to the sender 101. In this regard, the input/output circuit 205 is structured to exchange data, communications, instructions, etc. with an input/output component of the user device 110. Accordingly, in some arrangements, the input/output circuit 205 includes an input/output device such as a display device, touchscreen, keyboard, keypad, microphone, a camera, a microphone, speaker, a fingerprint reader, and/or the like. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still another arrangement, the input/output circuit 205 includes any combination of hardware components (e.g., a touchscreen), communication circuitry, and machine-readable media.

The user device 110 includes a network interface 206 which is configured for and structured to establish a communication session via a communication network with the provider institution computing system 130. Accordingly, the network interface 206 is an interface such as, but not limited to, the network interface 246.

The user device 110 includes at least one client-side application of the electronic banking platform such as but not limited to, an online banking client application 270, an mobile wallet client application 280, and so on. In other words, the sender 101 can access the electronic banking platform (e.g., accessing account information stored in the databases 250 and 252) provided by the provider institution computing system 130 using the online banking client application 270, the mobile wallet client application 280, and so on. In some examples, the online banking client application 270 and/or mobile wallet client application 280 are server-based applications executable on the user device 110. In this regard, the sender 101 has to download the application(s) prior to usage. In another arrangement, the online banking client application 270 and/or mobile wallet client application 280 are coded into the memory 204 of the user device 110. In still another arrangement, the online banking client application 270 and/or mobile wallet client application 280 are web-based interface applications. In this configuration, the sender 101 has to log onto or otherwise access the web-based interface before usage. In this regard, the online banking client application 270 and/or the mobile wallet client application 280 are supported by a separate computing system (e.g., the provider institution computing system 130) including one or more servers, processors, network interface modules, etc. that transmit the applications for use to the user device 110. In certain arrangements, the online banking client application 270 and/or mobile wallet client application 280 include an API and/or a SDK that facilitate integration of other applications. All such variations and combinations are intended to fall within the spirit and scope of the present disclosure.

The online banking client application 270 is communicably coupled to the provider institution computing system 130 (e.g., the account database 250) via the network and is structured to permit management of at least one account of the sender 101 via the online banking client application 270. In this regard, the online banking client application 270 can instruct the input/output circuit 205 to display user interfaces used to display information or receive user input related to current account balances, pending transactions, profile (e.g., contact information), rewards, bill pay, fund transfer, and/or the like. For example, the online banking client application 270 can configure the input/output circuit 205 to depict a loan (e.g., a mortgage, a personal loan, a car loan, a student loan, etc.) of the sender 101 and allows the sender 101 to pay the loan from an account of the sender 101. In some examples, a bill pay option is provided by the online banking client application 270, where the bill pay option allows the sender 101 to pay his/her bills in response to user input. In some arrangements, the online banking client application 270 is configured to process fund transfer from the sender 101 to the recipient 102 using one of the electronic P2P transfer platforms as described herein.

Via the online banking client application 270, the sender 101 can transfer funds, pay bills (e.g., mortgage, etc.), view balances, pay merchants, and otherwise manage accounts. Accordingly, the online banking client application 270 includes an account information circuit 214. The account information circuit 214 is linked to one or more accounts (stored in the account database 250) held by the sender 101 and permits management of the accounts (e.g., transfer funds, transfer balances between accounts, view payment history, etc.) by communicating with the provider institution computing system 130. The online banking client application 270 is communicably coupled to the mobile wallet client application 280. As such, in response to a mobile payment or fund transfer via the mobile wallet client application 280, the mobile wallet client application 280 causes the online banking client application 270 to update the payment account (i.e., the account that supported the mobile payment). As such, the online banking client application 270 and the mobile wallet client application 280 are communicably coupled to each other to enable actions supported by each respective application.

The mobile wallet client application 280 is communicably coupled to the provider institution computing system 130 (e.g., the mobile wallet database 252) via a communication network and is structured to facilitate purchases by the sender 101 via the mobile wallet client application 280. Accordingly, the mobile wallet client application 280 is linked or otherwise connected with one or more accounts (e.g., stored in the account database 250) of the sender 101. In operation, when at a point-of-sale terminal, the sender 101 initiates the mobile wallet client application 280 and provides a passcode (e.g., biometrics such as a thumbprint, facial recognition, voice, or retinal identification, a Personal Identification Number (PIN), a password, etc.) to authenticate the sender 101 and select the source payment account desired (e.g., an account from a particular financial institution that is linked to the mobile wallet client application 280). Via communication with the payment terminal (e.g., via near field communication), the aforementioned payment information is provided to the POS terminal or the merchant (e.g., via NFC, via barcode presentment, etc.) and the payment is processed. Beneficially, carrying payment cards are avoided or reduced via the mobile wallet client application 280. The mobile wallet client application 280 can also be used to transfer funds from an account added to the mobile wallet client application 280 to the recipient 102 in the manner described.

As mentioned herein, the mobile wallet client application 280 is structured to facilitate and permit payments or fund transfers by interfacing with an account held by the sender 101 at the financial institution 120. Accordingly, the mobile wallet client application 280 is communicably coupled via the network interface 206 over a communication network to the provider institution computing system 130. As shown, the mobile wallet client application 280 includes a payment processing circuit 216 structured to facilitate payments or fund transfers by the sender 101 via the mobile wallet client application 280. For example, the payment processing circuit 216 enables a quick-pay capability with a merchant. In this regard, the payment processing circuit 216 includes or is communicably coupled with a communication device (e.g., a near-field communication chip) that facilitates the exchange of information between the mobile wallet client application 280 and a POS terminal.

The user device 110 and the provider institution computing system 130 are shown to include various circuits and logic for implementing the operations described herein. While various circuits, interfaces, and logic with particular functionality are shown, it should be understood that the user device 110 and the provider institution computing system 130 can include any number of circuits, interfaces, and logic for facilitating the functions described herein. For example, the activities of multiple circuits are combined as a single circuit and implemented on a same processing circuit (e.g., the processing circuit 202 or 242), as additional circuits with additional functionality are included.

Figure 3:
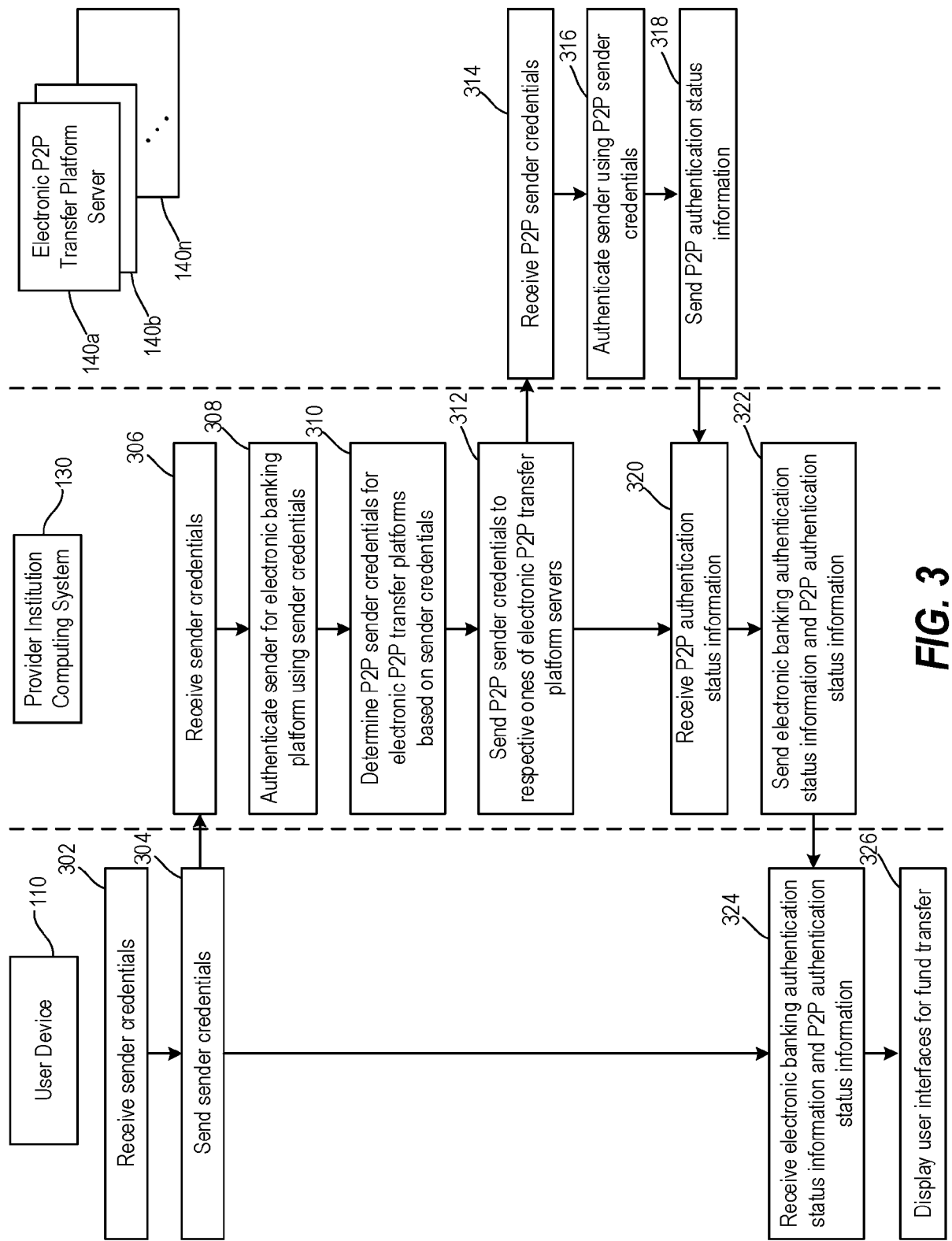
FIG. 3 is a flow diagram illustrating a method for authenticating a sender for an electronic banking platform and one or more electronic person-to-person (P2P) transfer platforms, according to some arrangements.

FIG. 3 is a flow diagram illustrating a method 300 for authenticating the sender 101 for an electronic banking platform and one or more electronic P2P transfer platforms according to some arrangements. In FIG. 3, the blocks in a column corresponding to the user device 110 are operations performed using at least a client-side application of the electronic banking platform executed by the user device 110. Examples of the client-side application include but are not limited to, the online banking client application 270, the mobile wallet client application 280, and so on. The blocks in a column corresponding to the provider institution computing system 130 are operations of the electronic banking platform backend and are performed using at least the integrated fund transfer circuit 265 and the electronic P2P transfer platform APIs 260a-260n. The blocks in a column corresponding to the electronic P2P transfer platform servers 140a-140n are operations of each of the electronic P2P transfer platforms. Referring to FIGS. 1-3, the method 300 allows the sender 101 to log into the electronic P2P transfer platforms as the sender 101 logs into the electronic banking platform (provisioned by the provider institution computing system 130). In other words, the sender 101 can be automatically logged into those electronic P2P transfer platforms for which the sender 101 has accounts with only the credentials for the electronic banking platform and without inputting any additional login credentials for any of those electronic P2P transfer platforms.

At 302, the client-side application receives sender credentials from the sender 101. As described, the client-side application can configure the input/output circuit 205 to display a user interface (e.g., a login user interface) configured to request and receive the sender credentials as user inputs. The sender credentials received at 302 are used for directly authenticating the sender 101 for the electronic banking platform provided by the provider institution computing system 130. For example, the login user interface can request the sender credentials such as but not limited to, a username, a password, an email, a phone number, biometric data (e.g., facial recognition data, fingerprinting data, voice data, etc.), and so on. The sender 101 can input the sender credentials using a touchscreen, keypad, keyboard, camera, microphone, fingerprint reader, or the like of the input/output circuit 205.

At 304, the client-side application sends (via the network interface 206) the sender credentials to the provider institution computing system 130 via the network. At 306, the integrated fund transfer circuit 265 receives the sender credentials from the user device 110. At 308, the integrated fund transfer circuit 265 authenticates the sender 101 to the electronic banking platform using the sender credentials. In response to determining that the sender credentials cannot authenticate the sender 101, the integrated fund transfer circuit 265 is configured to notify the user device 110 to display a user interface that requests the sender 101 to re-enter the sender credentials.

At 310, the integrated fund transfer circuit 265 determines P2P sender credentials of the sender 101 for the electronic P2P transfer platforms based on the sender credentials received at 306. The P2P sender credentials can be used to authenticate the sender 101 with the electronic P2P transfer platforms.

Figure 4:
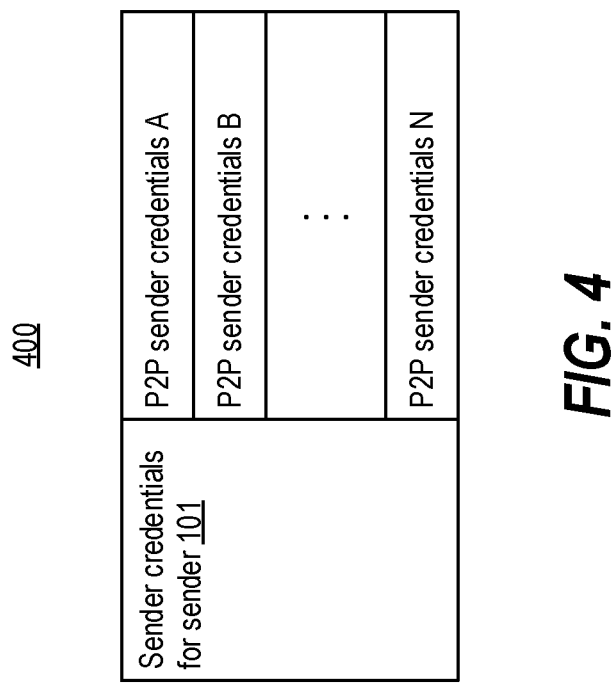
FIG. 4 is a mapping table illustrating correspondence between sender credentials of a sender and multiple sets of P2P sender credentials of the sender, according to some arrangements.

In some examples, the provider institution computing system 130 can maintain a mapping of the electronic banking platform credentials (e.g., the sender credentials received at 306) of customers to the electronic P2P transfer platform credentials (e.g., the P2P sender credentials). In that regard, FIG. 4 is a mapping table 400 illustrating the correspondence between the sender credentials of the sender 101 and multiple sets of P2P sender credentials of the sender 101, according to some arrangements. Such a mapping can be stored in a database (not shown) of the provider institution computing system 130 or in a secure storage connected to and is remote from the provider institution computing system 130. For each customer (e.g., the sender 101), the mapping table 400 includes the sender credentials (or any suitable unique identifier of the sender 101) and associated sets of P2P sender credentials (e.g., "P2P sender credentials A," "P2P sender credentials B," ... "P2P sender credentials N"). The integrated fund transfer circuit 265 is configured to query the mapping table 400 using the sender credentials or the unique identifier of the sender 101 to identify corresponding sets of the P2P sender credentials.

In one example, each set of P2P sender credentials includes one or more of a username, a password, an email, a phone number, biometric data, and the like. Such P2P sender credentials can be obfuscated or encrypted to protect privacy of the customers.

In another example, each set of P2P sender credentials includes a unique identifier that uniquely identifies the sender 101 for a corresponding one of the electronic P2P transfer platform servers 140a-140n. The unique identifier can be a numeric string, an alphabetical string, an alphanumeric string, or any other suitable identifier. The unique identifier can be generated pseudorandomly. The unique identifier can be negotiated between the provider institution 120 and a respective one of the electronic P2P transfer platforms, such that the provider institution computing system 130 and a respective one of the electronic P2P transfer platform servers 140a-140n agree that the unique identifier identifies the sender 101.

In some arrangements, prior to the execution of the method 300, the client-side application can configure the input/output circuit 205 to display a user interface that requests authorization of the sender 101 to link an account of the electronic banking platform with one or more accounts of the electronic P2P transfer platforms. Responsive to receiving the authorization via the user interface, the client-side application configures the input/output circuit 205 to display a user interface to receive the P2P sender credentials as user input from the sender 101. Examples of the P2P sender credentials include but are not limited to, a username, a password, an email, a phone number, biometric data (e.g., facial recognition data, fingerprinting data, voice data, etc.), and so on. The sender 101 can input the P2P sender credentials using a touchscreen, keypad, keyboard, camera, microphone, fingerprint reader, or the like of the input/output circuit 205. The P2P sender credentials can be sent by the client-side application to the integrated fund transfer circuit 265, which relays the P2P sender credentials to corresponding ones of the electronic P2P transfer platform servers 140a-140n via respective ones of the electronic P2P transfer platform APIs 260a-260n. Responsive to the electronic P2P transfer platform servers 140a-140n authenticating the sender 101 using the received P2P sender credentials, authentication confirmations are sent to the integrated fund transfer circuit 265. Responsive to receiving the authentication confirmations, the integrated fund transfer circuit 265 maps the P2P sender credentials to the sender 101 by storing the P2P sender credentials in the mapping table 400.

Sometimes, the sender 101 may add an account managed by the electronic banking platform as a payment source or a payment destination for a client-side electronic P2P transfer application (not shown) on the user device 110. The client-side electronic P2P transfer application is for a given electronic P2P transfer platform that is managed by one of the electronic P2P transfer platform server 140a-140n. The client-side electronic P2P transfer application may cause the input/output circuit 205 to display a user interface configured to receive user input of an account identifier (e.g., an account number) corresponding to the account managed by the electronic banking platform. In this case, the integrated fund transfer circuit 265 may receive a notification from the user device 110 or from the electronic P2P transfer platform server that the account of the electronic banking platform has been added to the client-side electronic P2P transfer application by the sender 101. Responsive to receiving such a notification, the integrated fund transfer circuit 265 may send a command via the network to the user device 110, triggering the input/output circuit 205 to display a user interface that requests authorization from the sender 101 to link the account of the electronic banking platform with the electronic P2P transfer platform within the context of the client-side application of the electronic banking platform. Responsive to receiving the authorization, the input/output circuit 205 is configured to display a user interface to receive the P2P sender credentials as user input from the sender 101. Examples of such P2P sender credentials include but are not limited to, a username, a password, an email, a phone number, biometric data (e.g., facial recognition data, fingerprinting data, voice data, etc.), and so on. The sender 101 can input the P2P sender credentials using a touchscreen, keypad, keyboard, camera, microphone, fingerprint reader, or the like of the input/output circuit 205. Alternatively, the P2P sender credentials can be automatically imported from the client-side electronic P2P transfer application or a secure storage (not shown) of the user device 110 without requesting the sender 101 to input the P2P sender credentials. The P2P sender credentials can be sent by the user device 110 to the integrated fund transfer circuit 265, which relays the P2P sender credentials to the electronic P2P transfer platform server via an electronic P2P transfer platform API. Responsive to the electronic P2P transfer platform server authenticating the sender 101 using the received P2P sender credentials, an authentication confirmation is sent to the integrated fund transfer circuit 265. Responsive to receiving the authentication confirmation, the integrated fund transfer circuit 265 maps the P2P sender credentials to the sender 101 by storing the P2P sender credentials in the mapping table 400.

In other examples, responsive to receiving a notification from the user device 110 or from the electronic P2P transfer platform server that the account has been added to the client-side electronic P2P transfer application by the sender 101, the integrated fund transfer circuit 265 is configured to negotiate a unique identifier with the electronic P2P transfer platform server to identify the sender 101. The integrated fund transfer circuit 265 maps the unique identifier to the sender 101 by storing the unique identifier as the P2P sender credentials in the mapping table 400.

At 312, the integrated fund transfer circuit 265 sends (via the network interface 246) the P2P sender credentials to the electronic P2P transfer platform servers 140a-140n, respectively, via a network to authenticate the sender 101. The integrated fund transfer circuit 265 sends the P2P sender credentials based on suitable routines and protocols provided by corresponding ones of the electronic P2P transfer platform APIs 260a-260n. The electronic P2P transfer platform servers 140a-140n receive the P2P sender credentials at 314 and authenticate the sender 101 using the P2P sender credentials at 316.

In some examples in which the P2P sender credentials are a unique identifier that uniquely identifies the sender 101 for an electronic P2P transfer platform server, instead of an authentication process (as typically performed if the P2P sender credentials are one or more of a username, a password, an email, a phone number, biometric data), the electronic P2P transfer platform server is merely notified that the sender 101 identified by the unique identifier as logged into the electronic P2P transfer platform server, assuming that the sender 101 is authenticated for the electronic banking platform at 208. In other words, the authentication process at the electronic banking platform is used as a proxy to the authentication process at the electronic P2P transfer platform server, such that responsive to determining that the sender 101 is authenticated using the sender credentials received at 306, the sender 101 is also authenticated at the electronic P2P transfer platform server. The electronic P2P transfer platform server needs to be notified of the identity of the sender 101, for example, using the unique identifier.

At 318, each of the electronic P2P transfer platform servers 140a-140n sends P2P authentication status information to the integrated fund transfer circuit 265 via the network. The integrated fund transfer circuit 265 receives the P2P authentication status information at 320 and sends the electronic banking authentication status information and the P2P authentication status information to the user device 110 over a network at 322. The user device 110 (e.g., the client-side application) receives the electronic banking authentication status information and the P2P authentication status information at 324.

In response to determining that electronic banking authentication status information indicates that the sender 101 is authenticated for the electronic banking platform and that the P2P authentication status information indicates that the sender 101 is authenticated for the electronic P2P transfer platform servers 140a-140n, the client-side application configures the input/output circuit 205 to display user interfaces for the fund transfers as described in further details herein.

In some arrangements, authenticating the sender 101 for the electronic P2P transfer platform servers 140a-140n (blocks 310-320) can be performed responsive to receiving the sender credentials at 306. Accordingly, authentication for the electronic P2P transfer platform servers 140a-140n can be performed in parallel with authenticating the sender 101 for the electronic banking platform at 308. In other arrangements, authentication for the electronic P2P transfer platform servers 140a-140n can be performed after the sender 101 is successfully authenticated for the electronic banking platform.

According to the method 300, the sender 101 needs to only provide the sender credentials to be authenticated to the electronic banking platform, and the sender 101 is also authenticated to the electronic P2P transfer platform servers 140a-140n automatically without further user input.

In some examples, the sender 101 may not have an account with one or more of the electronic P2P transfer platforms that can be linked to the electronic banking platform provided by the provider institution. The electronic banking platform may determine that the sender 101 does not have an account with one of the electronic P2P transfer platforms, for example, by determining that the sets of P2P sender credentials shown in the mapping table 400 do not include a set of credentials corresponding to that electronic P2P transfer platform. Furthermore, the client-side application of the electronic banking platform can receive, via the input/output circuit 205, user input from the sender 101 indicating that the sender 101 does not have an account with an electronic P2P transfer platform. In response, the client-side application of the electronic banking platform can configure the input/output circuit 205 to display a registration interface configured to request the sender 101 to register for the electronic P2P transfer platform. The registration interface is configured to receive sender information as user inputs for registering the sender 101 with the electronic P2P transfer platform.

Figure 5:
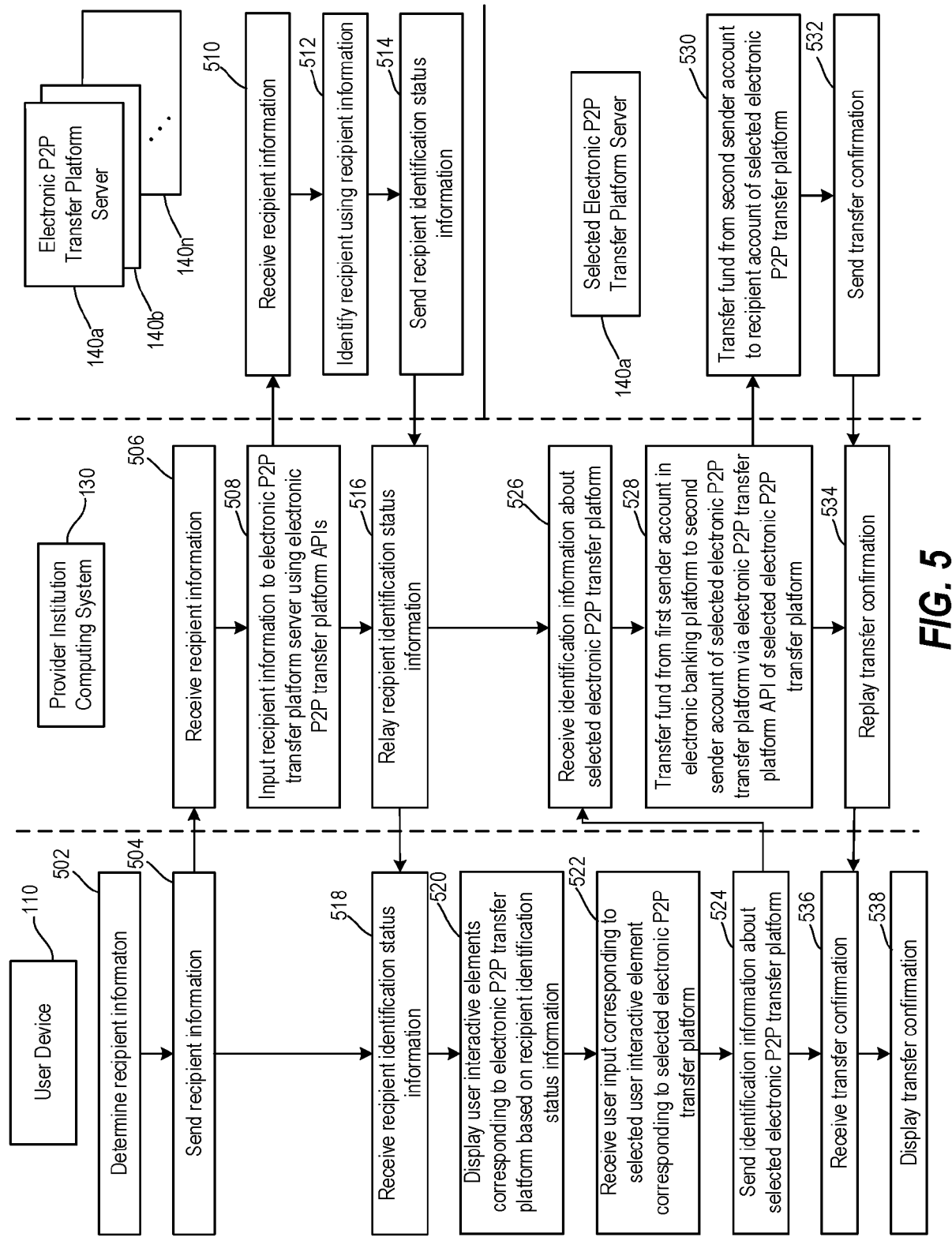
FIG. 5 is a flow diagram illustrating a method for transferring fund from a sender to a recipient using an electronic banking platform and an electronic person-to-person (P2P) transfer platform according to some arrangements.

FIG. 5 is a flow diagram illustrating a method 500 for transferring fund from the sender 101 to the recipient 102 using the electronic banking platform and an electronic person-to-person (P2P) transfer platform according to some arrangements. Referring to FIGS. 1-5, the method 500 can be performed after the sender 101 is successfully logged into the electronic banking platform and the electronic P2P transfer platform servers 140a-140n, for example, according to the method 300.

At 502, the client-side application determines recipient information. In some examples, the recipient information includes one or more of a name of the recipient 102, an email address of the recipient 102, a telephone number of the recipient 102, an address of the recipient 102, or a government-issued identification number of the recipient 102. In some examples, the recipient information further includes a transfer amount.

Figure 6A:
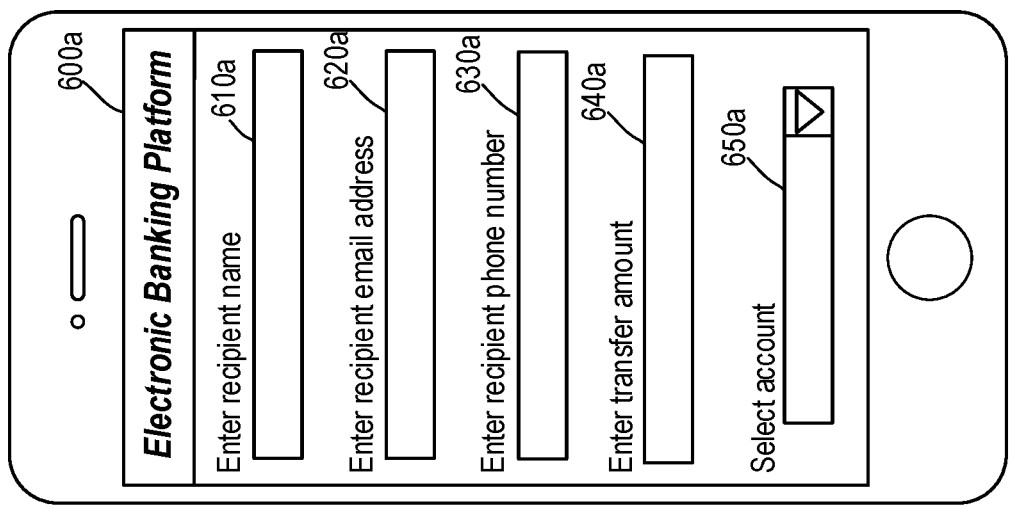
FIG. 6A is an interface display diagram illustrating a user interface configured for receiving user input of recipient information, according to some arrangements.

In some examples, the recipient information can be obtained using a user interactive interface. In that regard, FIG. 6A is an interface display diagram illustrating a user interface 600a configured for receiving user input of recipient information, according to some arrangements. Referring to FIG. 1-6A, the client-side application configures the input/output circuit 205 to display the user interface 600a. In other words, the user interface 600a is displayed from an application of the electronic banking platform provided by the provider institution computing system 130 that is executed by the user device 110. The user interface 600a is not displayed from any applications corresponding to any of the electronic P2P transfer platforms that may be installed on the user device 110. The user interface 600a includes various user interactive elements for receiving user input of the recipient information from the sender 101. For instance, a user interactive element 610a is configured to receive user input of a name of the recipient 102. A user interactive element 620a is configured to receive user input of an email address of the recipient 102. A user interactive element 630a is configured to receive user input of a phone number of the recipient 102. A user interactive element 640a is configured to receive user input of a transfer amount. In some examples, a user interactive element 650a is configured to receive user input of an account of the sender 101. The account is access electronically via electronic banking platform provided by the provider institution computing system 130 and is the source account for the transfer. The user interactive element 650a can be configured as a drop-down menu or another suitable While the user interface 600a requests the name, the email address, and the phone number of the recipient 102, other types of recipient information (e.g., an address, a government-issued identification number, and so on) that can be used to identify the recipient 102 for the electronic P2P transfer platforms can be configured to be received by the user interface 600a.

In some examples, the recipient information can be obtained using another application or retrieved from a suitable memory/database of the user device 110. For example, the client-side application configures the input/output circuit 205 to display a user interface by which the sender 101 can select contact information (e.g., a name, an email address, a phone number, an address, a government-issued identification number, and so on) of the recipient 102, where such contact information has been pre-stored for another feature or application of the user device 110. Such a user interface may enable the sender 101 to select the recipient information from a contact list stored by the user device 110 for contacting the recipient 102. The contact list may be a contact list for a mobile calling feature/application, a video conferencing feature/application, an emailing feature/application of the user device 110, and so on. The application that the contact list is used for (aside from the client-side application of the electronic banking platform) is different from the client-side application of the electronic banking platform.

At 504, the client-side application configures the network interface 206 to send the recipient information to the integrated fund transfer circuit 265. At 506, the integrated fund transfer circuit 265 receives the recipient information. The integrated fund transfer circuit 265 is configured to determine whether the recipient 102 has a recipient account at one or more of the electronic P2P transfer platform servers 140a-140n. By communicating the recipient information to the electronic P2P transfer platform servers 140a-140n. For example, at 508, the integrated fund transfer circuit 265 inputs the recipient information to each of the electronic P2P transfer platform servers 140a-140n using the electronic P2P transfer platform APIs 260a-260n, respectively. By using the electronic P2P transfer platform APIs 260a-260n, the sender 101 can control the fund transfer while staying in the user interfaces (e.g., the user interface 600a) provided by the client-side application (the online banking client application 270, the mobile wallet client application 280, and so on), making the fund transfer a user experience from the client-side application of the electronic banking platform and not any client-side application of the electronic P2P transfer platforms of the user device 110. Each of the electronic P2P transfer platform APIs 260a-260n provides suitable programs, protocols, routines, and such configured to facilitate the recipient information to be sent to each of the electronic P2P transfer platform servers 140a-140n.

At 510, each of the electronic P2P transfer platform servers 140a-140n receives the recipient information. At 512, each of the electronic P2P transfer platform servers 140a-140n identifies the recipient 102 using the recipient information, or at least attempts to identify the recipient 102 using the recipient information. For example, each of the electronic P2P transfer platform servers 140a-140n searches a user database for the recipient 102 by querying the user database with the recipient information as the input. At 514, each of the electronic P2P transfer platform servers 140a-140n sends recipient identification status information to the integrated fund transfer circuit 265. The recipient identification status information indicates whether a recipient account of the recipient 102 can be found by each of the electronic P2P transfer platform servers 140a-140n based on the recipient information.

At 516, the integrated fund transfer circuit 265 receives the recipient identification status information and relays the recipient identification status information to the user device 110. At 518, the client-side application receives the recipient identification status information. At 520, the client-side application configures the input/output circuit 205 to display user interactive elements corresponding to the electronic P2P transfer platforms based on the recipient identification status information. For example, the client-side application configures the input/output circuit 205 to display and offer for selection by the sender 101 user interactive elements corresponding to those electronic P2P transfer platforms for which the recipient 102 has accounts.

Figure 6B:
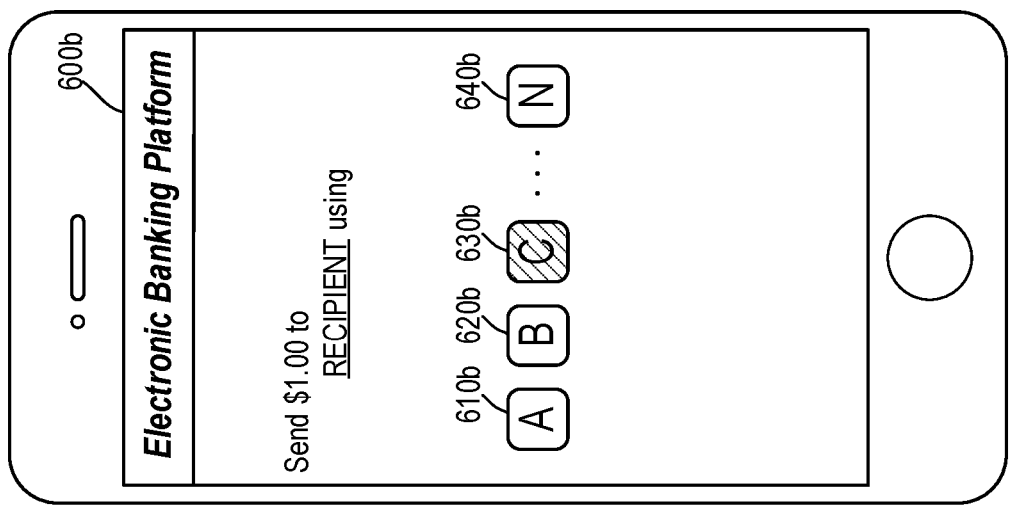
FIG. 6B is an interface display diagram illustrating a user interface configured for displaying and offering for selection by the sender user interactive elements corresponding to those electronic P2P transfer platforms for which the recipient has accounts, according to some arrangements.

In that regard, FIG. 6B is an interface display diagram illustrating a user interface 600b configured for displaying and offering for selection by the sender 101 user interactive elements corresponding to those electronic P2P transfer platforms for which the recipient 102 has accounts, according to some arrangements. Referring to FIG. 1-6B, the client-side application configures the input/output circuit 205 to display the user interface 600b. In other words, the user interface 600b is displayed from an application of the electronic banking platform provided by the provider institution computing system 130 that is executed by the user device 110. The user interface 600b is not displayed from any applications corresponding to any of the electronic P2P transfer platforms that may be installed on the user device 110. The user interface 600b includes various user interactive elements for receiving user input for selection of one of the electronic P2P transfer platforms for which the recipient 102 has a recipient account.

Illustrating with an example, the recipient identification status information received (indirectly) from the electronic P2P transfer platform servers 140a-140n indicates that out of all the electronic P2P transfer platforms (corresponding to the electronic P2P transfer platform servers 140a-140n), the recipient 102 has a recipient account with two electronic P2P transfer platforms. The two electronic P2P transfer platforms are provided by the electronic P2P transfer platform servers 140a-140b. The user interface 600b displays user interactive elements 610b and 620b and allows the sender 101 to select either user interactive element 610b or 620b. The user interactive element 610b corresponds to performing the fund transfer using the electronic P2P transfer platform provided by the electronic P2P transfer platform server 140a. The user interactive element 620b corresponds to performing the fund transfer using the electronic P2P transfer platform provided by the electronic P2P transfer platform server 140b. The user interactive elements 630b-640b correspond to the rest of the available electronic P2P transfer platforms (provided by the electronic P2P transfer platform servers 140c-140n). As shown, the interactive elements 630b-640b are displayed differently (e.g., have different shadings, colors, sizes, or the like) than the user interactive elements 610b and 620b, and that the user interactive elements 630b-640b are not selectable by the sender 101. As described, this is because the recipient 102 does not have any account for the electronic P2P transfer platforms corresponding to the interactive elements 630b-640b. In other arrangements, the user interactive elements corresponding to the electronic P2P transfer platforms for which the recipient 102 does not have any account are suppressed from being displayed (i.e., not displayed or hidden so that the sender 101 does not see those user interactive elements).

In some arrangements, the user interactive elements corresponding to the electronic P2P transfer platforms for which the sender 101 does not have any account can be displayed differently (e.g., have different shadings, colors, sizes, or the like) than those user interactive elements corresponding to the electronic P2P transfer platforms for which both the sender 101 and the recipient 102 have accounts. In some arrangements, the user interactive elements corresponding to the electronic P2P transfer platforms for which the sender 101 does not have any account are suppressed from being displayed (i.e., not displayed or hidden so that the sender 101 does not see those user interactive elements) while those user interactive elements corresponding to the electronic P2P transfer platforms for which both the sender 101 and the recipient 102 have accounts are displayed.

At 522, the client-side application receives user input corresponding to a selected user interactive element (e.g., the user interactive element 610b) corresponding to a selected electronic P2P transfer platform (e.g., provided by the electronic P2P transfer platform server 140a). At 524, the client-side application sends identification information about the selected electronic P2P transfer platform to the integrated fund transfer circuit 265, which receives the identification information about the selected electronic P2P transfer platform at 526.

The electronic transfer from the sender 101 to the recipient 102 can be processed using the electronic banking platform and the selected P2P transfer platform. That is, the transfer amount can be transferred from a first sender account configured to be electronically accessed by the sender 101 using the electronic banking platform to a recipient account configured to be electronically accessed by the recipient 102 using the selected electronic P2P transfer platform. In some examples, to achieve that, at 528, the integrated fund transfer circuit 265 is configured to transfer the transfer amount from the first sender account (of the electronic banking platform) of the sender 101 to a second sender account (of the selected electronic P2P transfer platform) of the sender 101 via the electronic P2P transfer platform API 260a corresponding to the selected electronic P2P transfer platform, which is managed by the electronic P2P transfer platform server 140a. The electronic P2P transfer platform API 260a provides suitable programs, protocols, routines, and such configured to facilitate the transfer from the first sender account to the second sender account. The second sender account is configured to be electronically accessed by the sender 101 using the selected electronic P2P transfer platform (here, through the electronic banking platform instead of directly using the selected electronic P2P transfer platform).

Figure 6C:
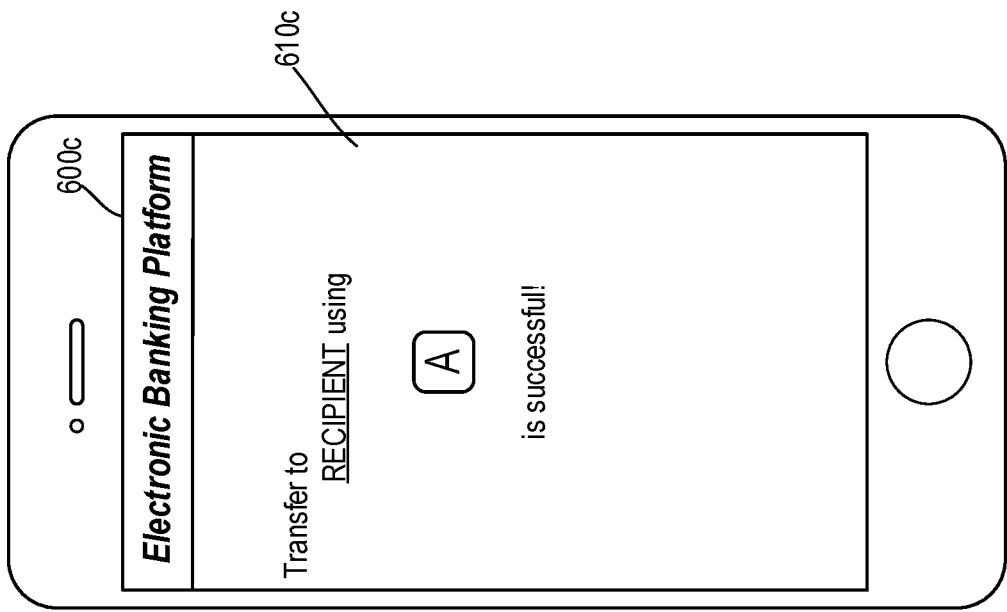
FIG. 6C is an interface display diagram illustrating a user interface configured for displaying a transfer confirmation message, according to some arrangements.

At 530, the selected electronic P2P transfer platform server 140a transfers the transfer amount from the second sender account to the recipient account. The recipient account has been identified at 512. At 532, the selected electronic P2P transfer platform server 140a sends a transfer confirmation to the integrated fund transfer circuit 265. At 534, the integrated fund transfer circuit 265 relays the transfer confirmation to the client-side application, which receives the transfer confirmation at 536. At 538, the client-side application configures the input/output circuit 205 to display the transfer confirmation. In that regard, FIG. 6C is an interface display diagram illustrating a user interface 600c configured for displaying a transfer confirmation message 610c, according to some arrangements.

Accordingly, the electronic transfer is processed using the selected P2P transfer platform (corresponding to the server 140a) in response to or after receiving the user input corresponding to the selected user interactive element without requesting any authentication information of the sender 101 to log into the selected P2P transfer platform and without requesting any identification information of the recipient 102.

It should be noted that the term "example" as used herein to describe various embodiments or arrangements is intended to indicate that such embodiments or arrangements are possible examples, representations, and/or illustrations of possible embodiments or arrangements (and such term is not intended to connote that such embodiments or arrangements are necessarily crucial, extraordinary, or superlative examples).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, touch sensitive screen or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and While this specification contains many specific implementation details, these should not be construed as limitations on the scope of any arrangement or of what may be claimed, but rather as descriptions of features specific to particular implementations of particular arrangements. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for performing an electronic transfer from a sender to a recipient using an electronic banking platform provided by a provider institution of the sender, the method comprising:

storing a mapping between sender credentials of the sender used to authenticate the sender for logging into the electronic banking platform and a plurality of person-to-person (P2P) sender credentials of the sender used to authenticate the sender for logging into respective ones of a plurality of electronic P2P transfer platforms;

authenticating the sender for logging into the electronic banking platform using the sender credentials;

authenticating the sender for logging into each of the plurality of electronic P2P transfer platforms according to a corresponding one of the plurality of P2P sender credentials determined based on the same sender credentials and the mapping, wherein authenticating the sender for the electronic banking platform and authenticating the sender for each of the plurality of electronic P2P transfer platforms occur simultaneously;

determining recipient information for the electronic transfer using a first user interface of the electronic banking platform, wherein the recipient information comprises a recipient identifier that identifies the recipient;

in response to determining the recipient information, displaying two or more user interactive elements in a second user interface of the electronic banking platform, wherein each of the two or more user interactive elements provides an interface to a different one of the plurality of electronic P2P transfer platforms;

receiving user input selecting a selected user interactive element of the two or more user interactive elements, wherein the selected user interactive element provides an interface to a selected electronic P2P transfer platform of the plurality of electronic P2P transfer platforms;

processing the electronic transfer using the electronic banking platform and the selected P2P transfer platform;
determining that the sender does not have an account with one of the plurality of electronic P2P transfer platforms based on user input of the sender; and
suppressing displaying of a user interactive element providing an interface to the one of the plurality of electronic P2P transfer platforms.

2. The method of claim 1, wherein the recipient information comprises a transfer amount.

3. The method of claim 2, wherein processing the electronic transfer using the electronic banking platform and the selected P2P transfer platform comprises transferring the transfer amount from a first sender account configured to be electronically accessed by the sender using the electronic banking platform to a recipient account configured to be electronically accessed by the recipient using the selected electronic P2P transfer platform.

4. The method of claim 3, wherein the transfer amount is transferred from the first sender account to the recipient account via a second sender account configured to be electronically accessed by the sender using the selected electronic P2P transfer platform.

5. The method of claim 1, wherein the recipient identifier comprises at least one of a name, an email address, a telephone number, an address, or a government-issued identification number.

6. The method of claim 1, further comprising
determining that the sender does not have an account with one of the plurality of electronic P2P transfer platforms based on user input of the sender; and
displaying a registration interface for the one of the plurality of electronic P2P transfer platforms, wherein the registration interface is configured to receive sender information for registering the sender with the one of the plurality of electronic P2P transfer platforms.

7. The method of claim 1, wherein the electronic transfer is processed using the selected P2P transfer platform in response to receiving the user input selecting the selected user interactive element without requesting any authentication information of the sender to log into the selected P2P transfer platform.

8. The method of claim 1, wherein the electronic transfer is processed using the selected P2P transfer platform in response to receiving the user input selecting the selected user interactive element without requesting any identification information of the recipient.

9. The method of claim 1, further comprising determining that the recipient has an account at each of the plurality of electronic P2P transfer platforms using the recipient information.

10. The method of claim 1, wherein the electronic banking platform comprises at least one of a mobile wallet client application or an online banking client application.

11. A non-transitory computer-readable medium having computer-readable instructions such that, when executed, causes a processor of a provider institution computing system to perform an electronic transfer from a sender to a recipient using an electronic banking platform provided by the provider institution computing system, the processor is configured to:
store a mapping between sender credentials of the sender used to authenticate the sender for logging into the electronic banking platform and a plurality of person-to-person (P2P) sender credentials of the sender used to authenticate the sender for logging into respective ones of a plurality of electronic P2P transfer platforms;
authenticate the sender for logging into the electronic banking platform using the sender credentials;
authenticate the sender for logging into each of the plurality of electronic P2P transfer platforms according to a corresponding one of the plurality of P2P sender credentials determined based on the same sender credentials and the mapping, wherein authenticating the sender for the electronic banking platform and authenticating the sender for each of the plurality of electronic P2P transfer platforms occur simultaneously;
determine recipient information for the electronic transfer using a first user interface of the electronic banking platform, wherein the recipient information comprises a recipient identifier that identifies the recipient;
in response to determining the recipient information, display two or more user interactive elements in a second user interface of the electronic banking platform, wherein each of the two or more user interactive elements provides an interface to a different one of a plurality of electronic P2P transfer platforms;
receive user input selecting a selected user interactive element of the two or more user interactive elements, wherein the selected user interactive element provides an interface to a selected electronic P2P transfer platform of the plurality of electronic P2P transfer platforms;
process the electronic transfer using the electronic banking platform and the selected P2P transfer platform;
determining that the sender does not have an account with one of the plurality of electronic P2P transfer platforms based on user input of the sender; and
suppressing displaying of a user interactive element providing an interface to the one of the plurality of electronic P2P transfer platforms.

12. The non-transitory computer-readable medium of claim 11, wherein the recipient information comprises a transfer amount.

13. The non-transitory computer-readable medium of claim 12, wherein the processor is configured to process the electronic transfer using the electronic banking platform and the selected P2P transfer platform by transferring the transfer amount from a first sender account configured to be electronically accessed by the sender using the electronic banking platform to a recipient account configured to be electronically accessed by the recipient using the selected electronic P2P transfer platform.

14. The non-transitory computer-readable medium of claim 13, wherein the transfer amount is transferred from the first sender account to the recipient account via a second sender account configured to be electronically accessed by the sender using the selected electronic P2P transfer platform.

15. A provider institution computing system configured to perform an electronic transfer from a sender to a recipient using an electronic banking platform provided by the provider institution computing system, the provider institution computing system comprising:
a network device; and
a processing circuit having a processor and a memory, wherein the processing circuit is configured to
store a mapping between sender credentials of the sender used to authenticate the sender for logging into the electronic banking platform and a plurality of person-to-person (P2P) sender credentials of the sender used to authenticate the sender for logging into respective ones of a plurality of electronic P2P transfer platforms;
authenticate the sender for logging into the electronic banking platform using the sender credentials;

authenticate the sender for logging into each of the plurality of electronic P2P transfer platforms according to a corresponding one of the plurality of P2P sender credentials determined based on the same sender credentials and the mapping, wherein authenticating the sender for the electronic banking platform and authenticating the sender for each of the plurality of electronic P2P transfer platforms occur simultaneously;

determine recipient information for the electronic transfer using a first user interface of the electronic banking platform displayed on a user device, wherein the recipient information comprises a recipient identifier that identifies the recipient;

in response to determining the recipient information, display two or more user interactive elements in a second user interface of the electronic banking platform displayed on the user device, wherein each of the two or more user interactive elements provides an interface to a different one of a plurality of electronic P2P transfer platforms;

receive user input selecting a selected user interactive element of the two or more user interactive elements, wherein the selected user interactive element provides an interface to a selected electronic P2P transfer platform of the plurality of electronic P2P transfer platforms;

process the electronic transfer using the electronic banking platform and the selected P2P transfer platform;

determine that the sender does not have an account with one of the plurality of electronic P2P transfer platforms based on user input of the sender; and suppress displaying of a user interactive element providing an interface to the one of the plurality of electronic P2P transfer platforms.

* * * * *